Dec. 23, 1930.  F. H. OWENS  1,786,220

OPTICAL PRINTER

Filed Nov. 12, 1926

INVENTOR
FREEMAN H. OWENS.
BY Philip S. Hoskins
ATTORNEY

Patented Dec. 23, 1930

1,786,220

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTER

Application filed November 12, 1926. Serial No. 147,977.

My invention relates generally to optical printers of the type used for printing images from a negative film to a positive film, and is particularly adapted for such printing of moving picture film of which there are long lengths to be printed, the images appearing successively on the film.

The primary object of my invention is to provide a printer which will simultaneously project, reduce and print the images from the standard size of moving picture film on to a smaller size of film commonly known as half size or 16 mm. film. The purpose of this is to enable pictures which have already been made on standard size film to be printed on the small size for use in projectors adapted for the small size only.

A still further object is to provide such an apparatus wherein both films are driven by a common shaft, whereby the entire apparatus may be enclosed within a relatively small space.

Still another object is to provide a novel form of double sprocket on a single shaft for simultaneously moving both the large and small sized films.

Other objects and advantages in details of construction and operation will be apparent as the description proceeds, reference being had to the accompanying drawing wherein like reference numerals indicate like parts.

Figure 1:
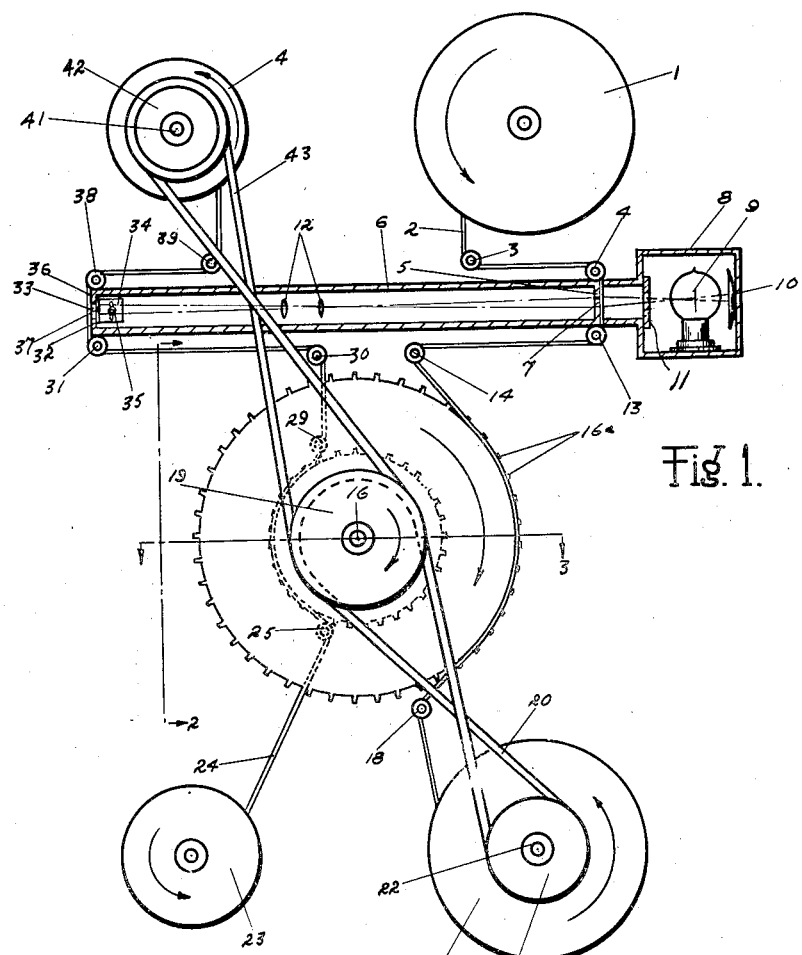
Figure 1 is a diagrammatic side view of my improved printer, partly in section.
Figures 2, 3:
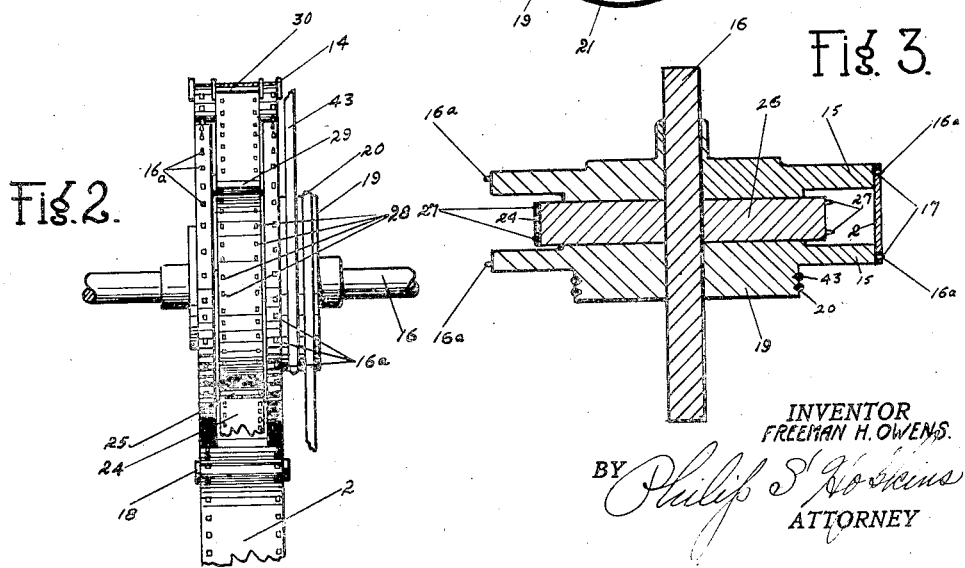
Figure 2 is a detail front view taken on the line 2—2 of Figure 1.
Figure 3 is a detail sectional view taken on the line 3—3 of Figure 1.

All of the figures are more or less diagrammatic in character, the common and well known details incident to an apparatus of this kind having been omitted for clearness of illustration.

I have illustrated and will describe my improved printer as a continuous printer, although it will be understood that the same principle is equally adaptable to an intermittent movement using a shutter to cover the movement of the film between exposures.

The reference numeral 1 indicates a reel or other suitable source of supply for the strip of negative film 2, of the usual or standard size. This film 2 is brought downwardly from the reel 1 over the idle rollers 3 and 4, past the end 5 of a box or casing 6. The end 5 of this box 6 over which the negative film 2 is drawn, is provided with a slit 7. Adjacent this end of the box 6 is a suitable casing 8 enclosing a light source 9, reflector 10, and diffusing glass or screen 11. The light from the lamp 9 passes through the negative film 2 and on through the slit 7. The images thus illuminated as they pass the end of the box 6 are projected through the slit 7, and through the lenses 12 within the box 6, so positioned as to reduce the size of the images, which then pass on to the opposite end of the box 6, to be described later.

As the negative film 2 leaves the end 5 of the box 6, it passes over idle rollers 13 and 14, and then over the flanges 15 constituting a sprocket rigidly mounted on the shaft 16. The flanges 15 are provided with sprocket teeth 16a for engaging within the perforations 17 at the edges of the film whereby the film is drawn from its source of supply 1 as the sprocket is rotated. The negative film 2, after engaging with a portion of the periphery of the sprocket flanges 15, leaves such flanges, and, passing over the idle roller 18 is wound up on the take up reel 19. One of the flanges 15 of the sprocket is provided with a double pulley 19 over which passes an endless belt 20, also looped over the pulley 21 mounted on the shaft 22 upon which the take up reel 19 is secured. It will be understood, therefore, that as the sprocket 15 is rotated from any suitable source of power, through the shaft 16, the negative film 2 will be withdrawn from the supply reel 1, moved past the end 5 and slit 7 of the box 6 where it is illuminated by the lamp 9, and then wound upon the take up reel 19.

A supply reel 23 is also provided for the smaller or half size positive film 24, from which reel the positive film extends upwardly over the idle roller 25 into engagement with a relatively small sprocket 26 positioned between the flanges 15 of the large sprocket. This sprocket 26 is provided with sprocket pins or teeth 27 which engage within the perforations 28 of the positive film 24, thus causing the same to be moved upon the rotation of the shaft 16, to which the smaller sprocket 26 is also secured. After leaving the sprocket 26, the positive film 24 is carried over idle rollers 29, 30 and 31, and thence past the end 32 of the box 6, opposite the end 5 thereof. This end 32 of the box is also provided with a slit 33, past which the film moves and within the box 6 directly adjacent this end 32 is an adjustable slit member comprising the wing 34 adjustably secured to one side of the box 6 as by the pin and slot connection 35, and having an angle member 36 extending over the end 32 of the box and over the slit 33 therein. This angle member 36 is also provided with a slit 37 through which the reduced projected images from the negative film 2 pass on to the positive film 24 as it moves past the end of the box. This adjustment is provided to accommodate the position of the projected images from the negative film with respect to the perforations in the film, for the purpose of framing.

After passing over the end of the box, the positive film 24 again turns over idle rollers 38 and 39, and is wound upon the take up reel 40 mounted on the shaft 41 which is provided with a pulley 42 over which passes an endless belt 43, also engaging around the double pulley 19 on the shaft 16.

From the foregoing, it will be understood that by means of a single shaft and my novel double sprocket device, the positive and negative films of different sizes may be simultaneously moved at constant speed and the images from the negative film continuously printed on the positive film, said films moving in opposite directions.

By the term "negative" film, I refer to sensitized exposed and developed film, and by "positive" film, I refer to sensitized unexposed film.

Obviously, many changes may be made in details of construction and arrangement of parts without departing from the spirit and scope of my invention. I do not limit myself, therefore, to the exact construction shown and described other than by the appended claims.

I claim:—

1. An optical printer comprising spaced parallel means for guiding strips of negative and positive film of different widths in spaced parallel relation, optical means for projecting images directly from said negative film to said positive film, a single rotatable shaft, and sprockets of different sizes on said shaft for moving said film strips synchronously.

2. An optical printer comprising spaced parallel means for guiding negative and positive film of different widths in spaced parallel relation, optical means for projecting images directly from said negative film to said positive film, a single rotatable shaft, and sprockets of different sizes on said shaft for moving said film strips synchronously, and in opposite directions.

3. An optical printer comprising spaced parallel means for guiding strips of negative and positive film of different widths in spaced parallel relation, optical means including a light source and a lens for projecting images directly from said negative film to said positive film, a single shaft, and relatively large and small sprockets on said shaft for moving said film strips synchronously and in opposite directions.

4. An optical printer comprising spaced parallel means for guiding strips of negative and positive film of different widths in spaced parallel relation, optical means for projecting images directly from the negative to the positive film, a single shaft, spaced flanges on said shaft constituting a relatively large sprocket for moving said relatively wide film and a relatively small sprocket between said flanges for moving said relatively narrow film, whereby said film strips are moved synchronously, said film strips engaging on opposite sides of said sprockets whereby they are moved in opposite directions.

FREEMAN H. OWENS.